Feb. 8, 1944.           J. W. KINNUCAN           2,340,885
                  FABRICATED CRANKCASE STRUCTURE
                      Filed Dec. 7, 1940          8 Sheets-Sheet 2
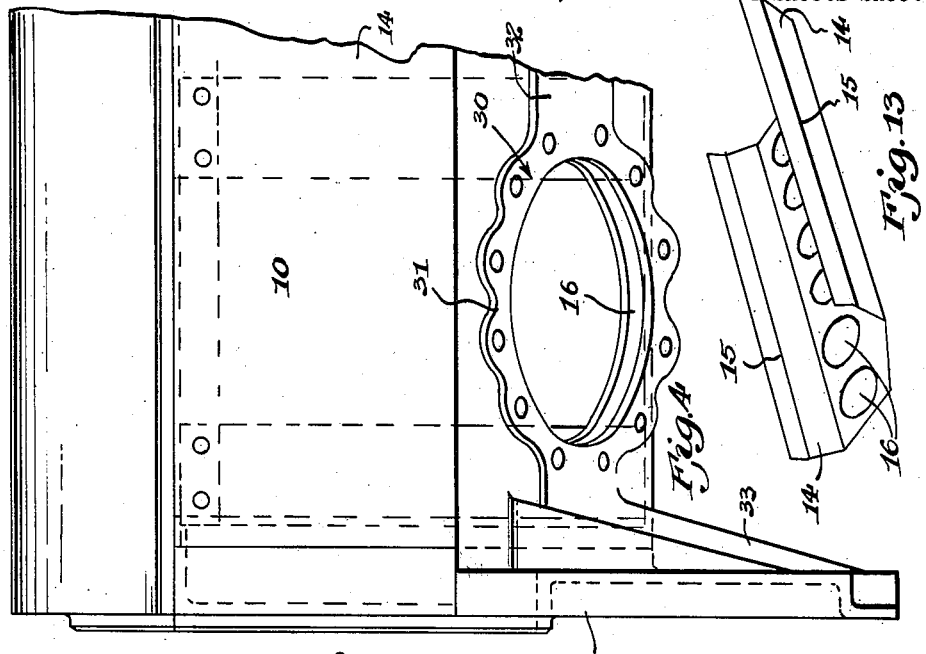
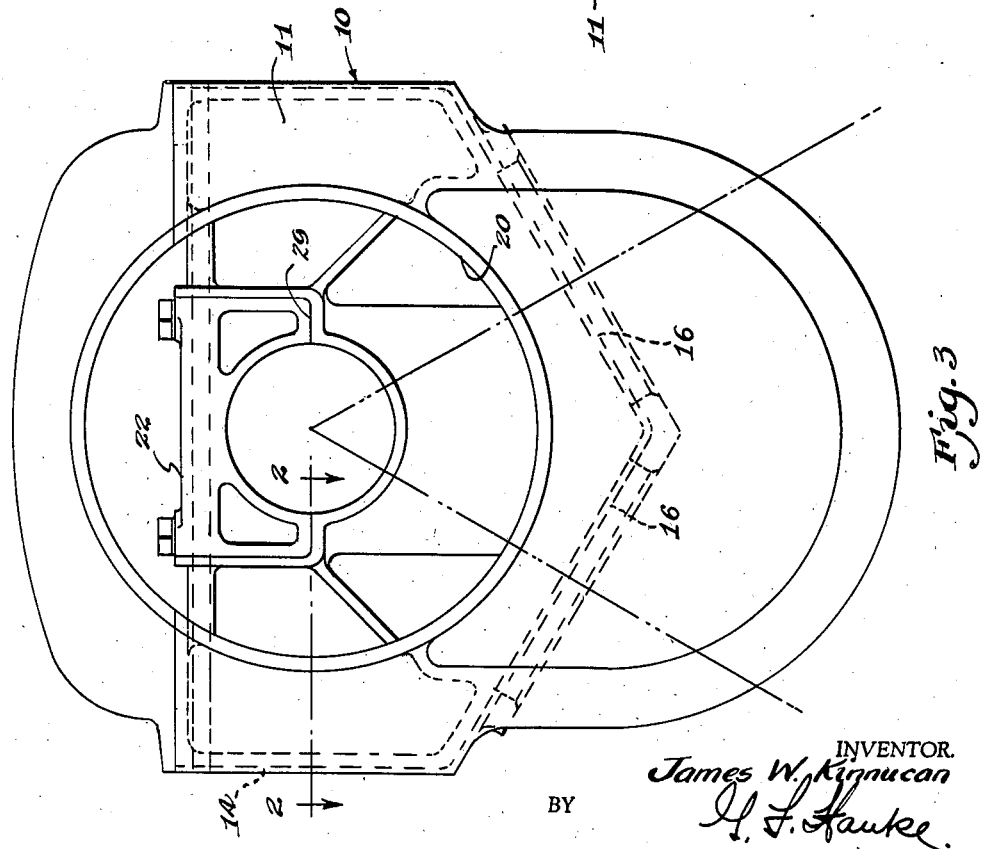
INVENTOR.
James W. Kinnucan
BY
ATTORNEY.

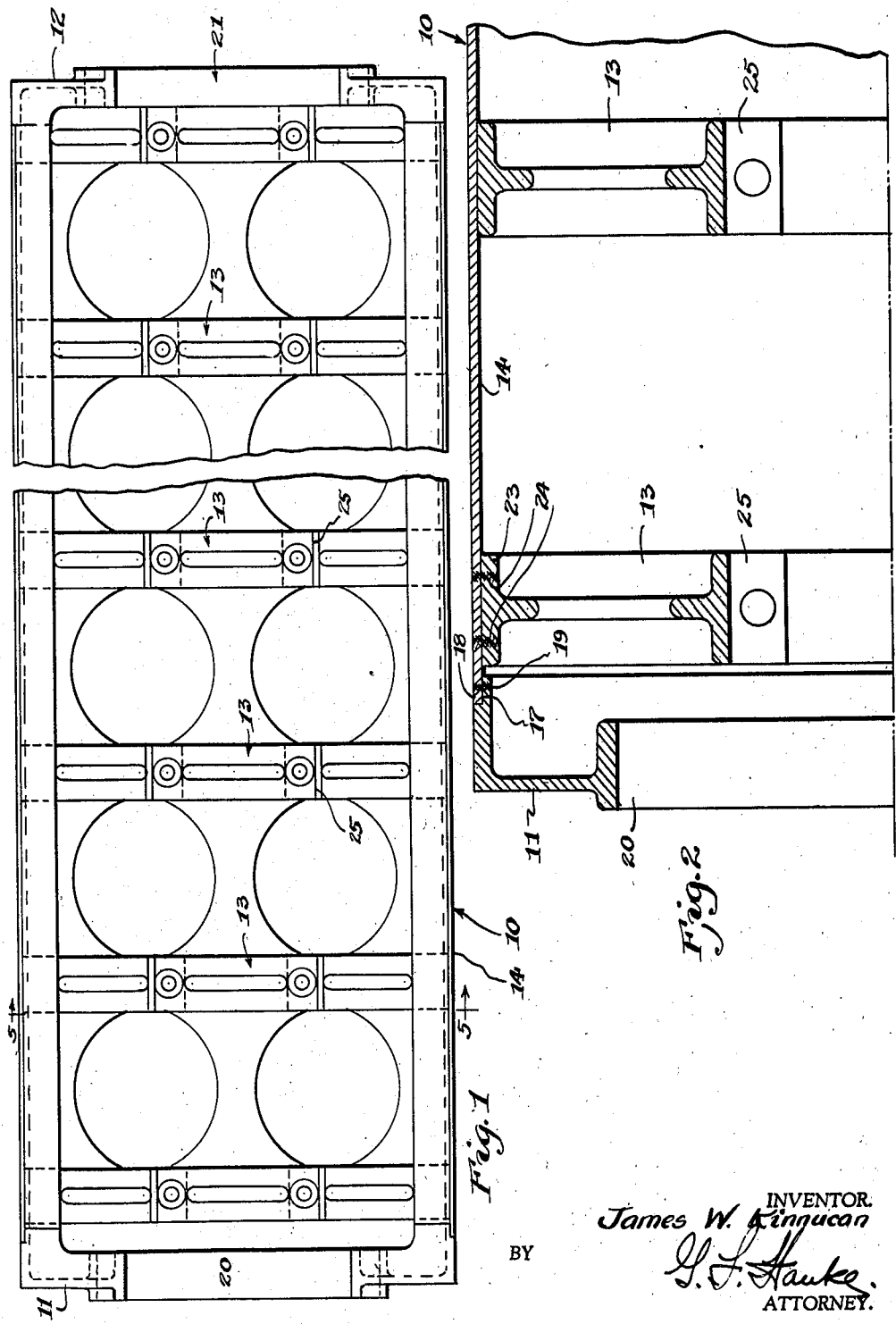

Feb. 8, 1944.  J. W. KINNUCAN  2,340,885
FABRICATED CRANKCASE STRUCTURE
Filed Dec. 7, 1940  8 Sheets-Sheet 3
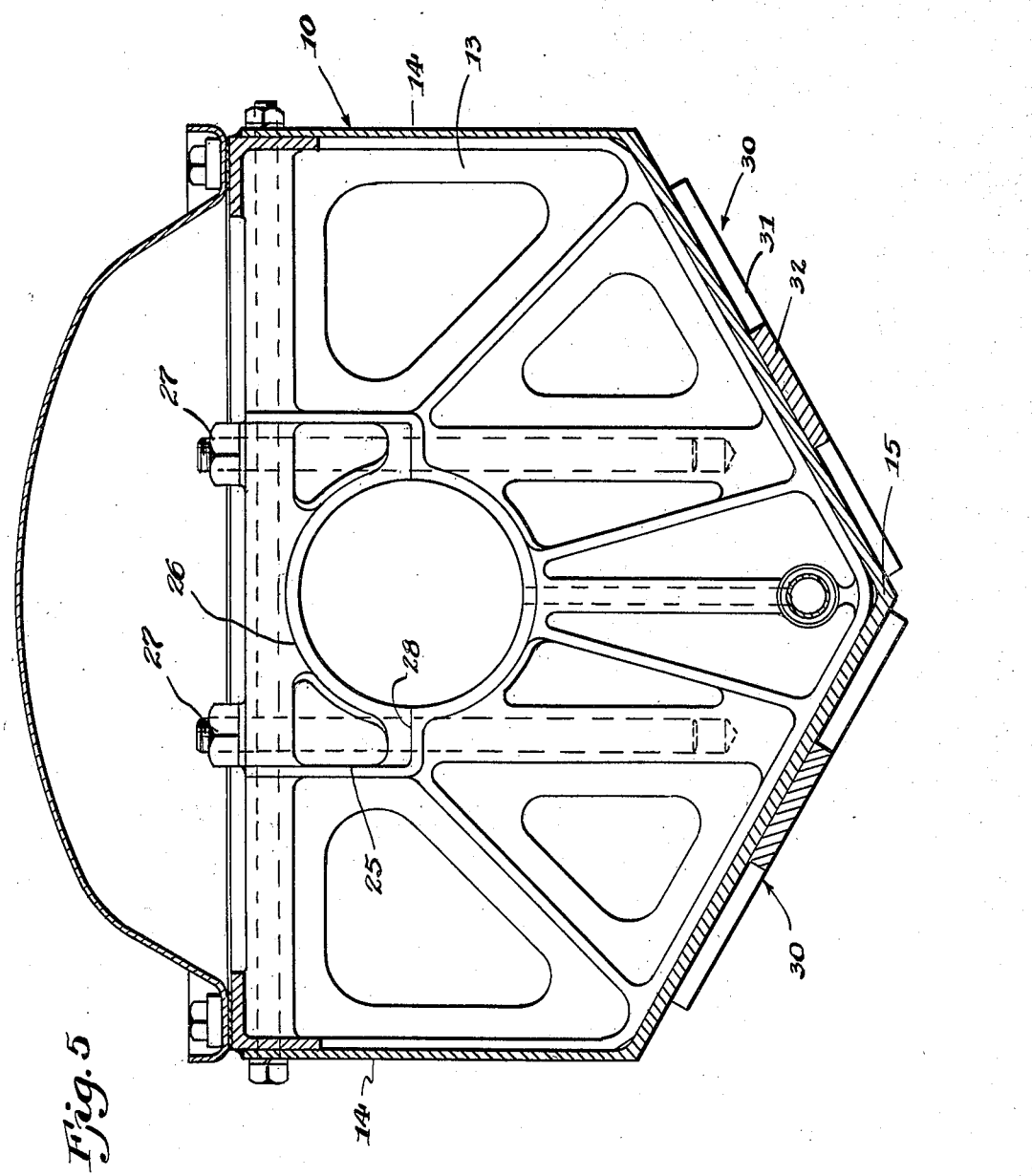
INVENTOR.
James W. Kinnucan.
BY
ATTORNEY.

Feb. 8, 1944.  J. W. KINNUCAN  2,340,885
FABRICATED CRANKCASE STRUCTURE
Filed Dec. 7, 1940  8 Sheets-Sheet 4
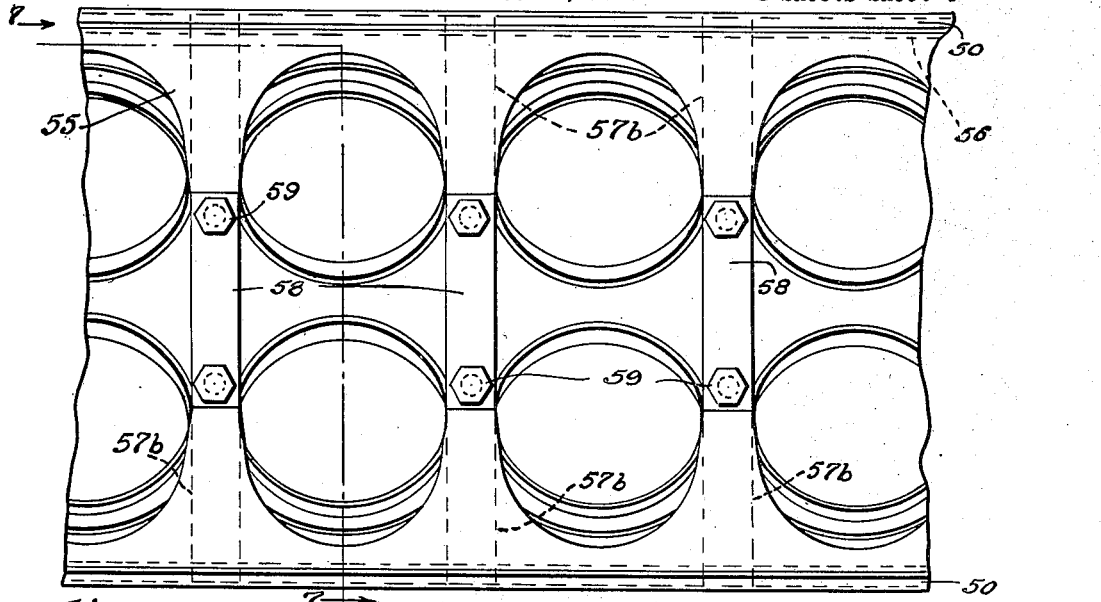
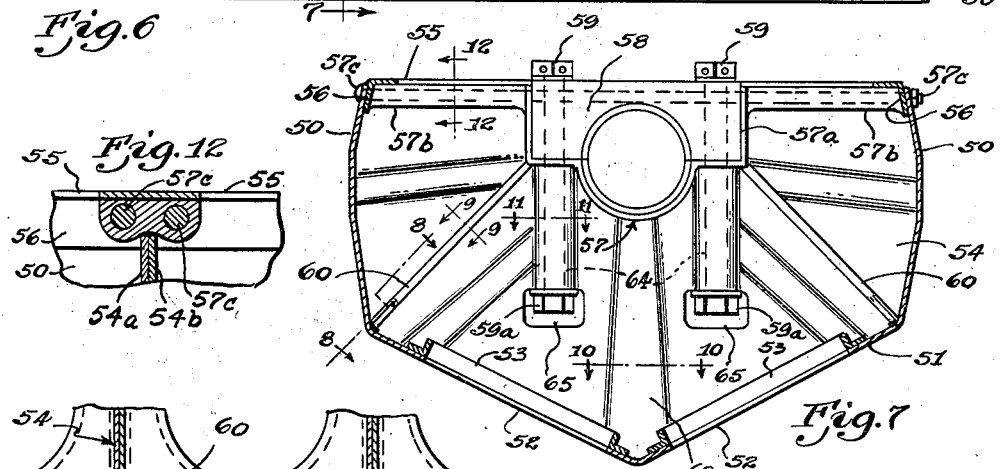
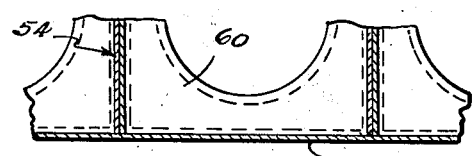
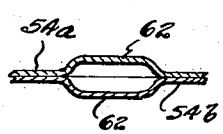
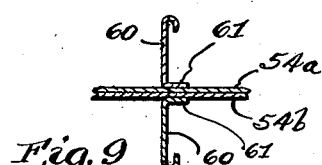
INVENTOR.
James W. Kinnucan.
BY
ATTORNEY.

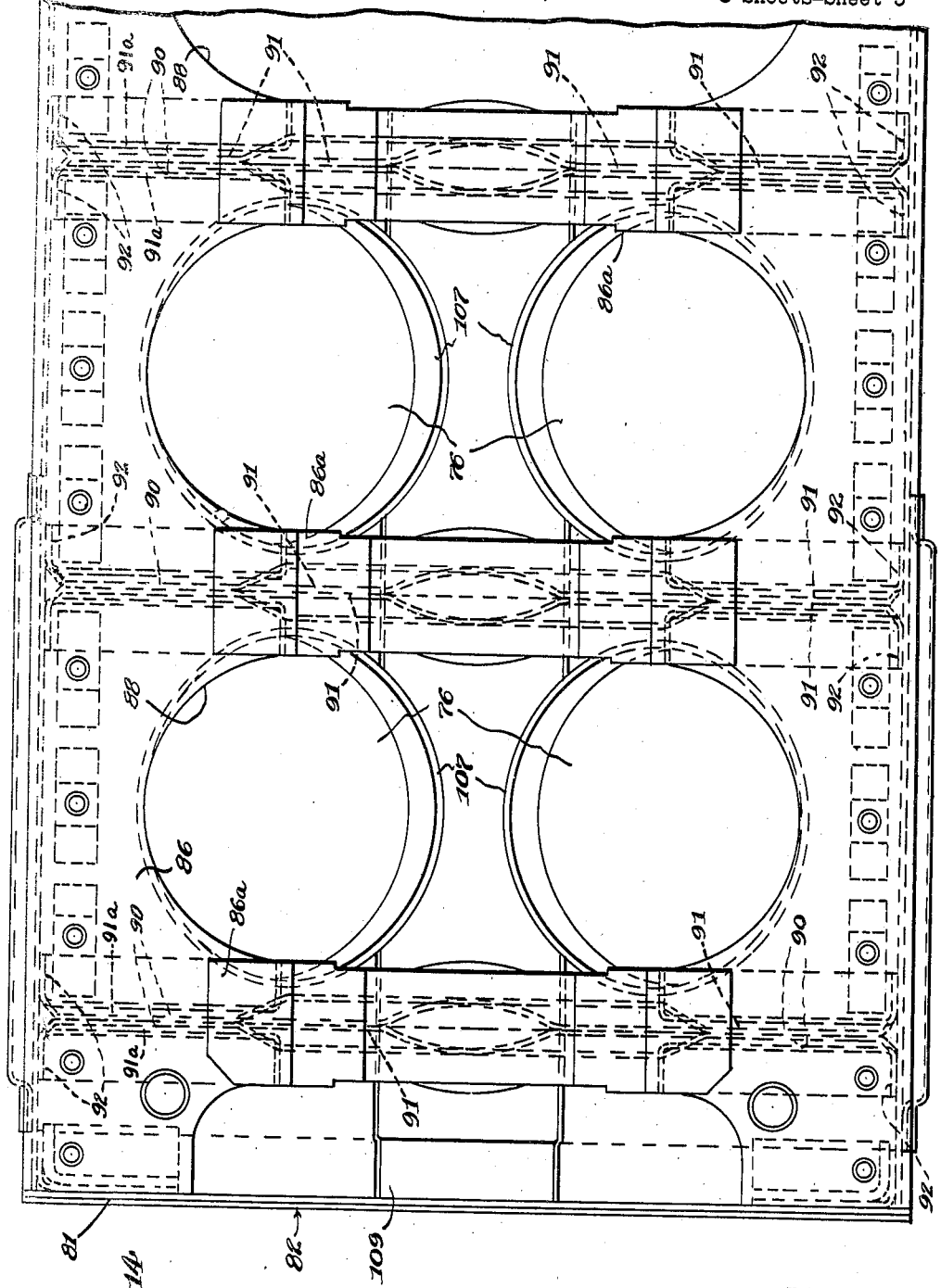

Feb. 8, 1944.                J. W. KINNUCAN                 2,340,885
                     FABRICATED CRANKCASE STRUCTURE
                        Filed Dec. 7, 1940          8 Sheets-Sheet 6
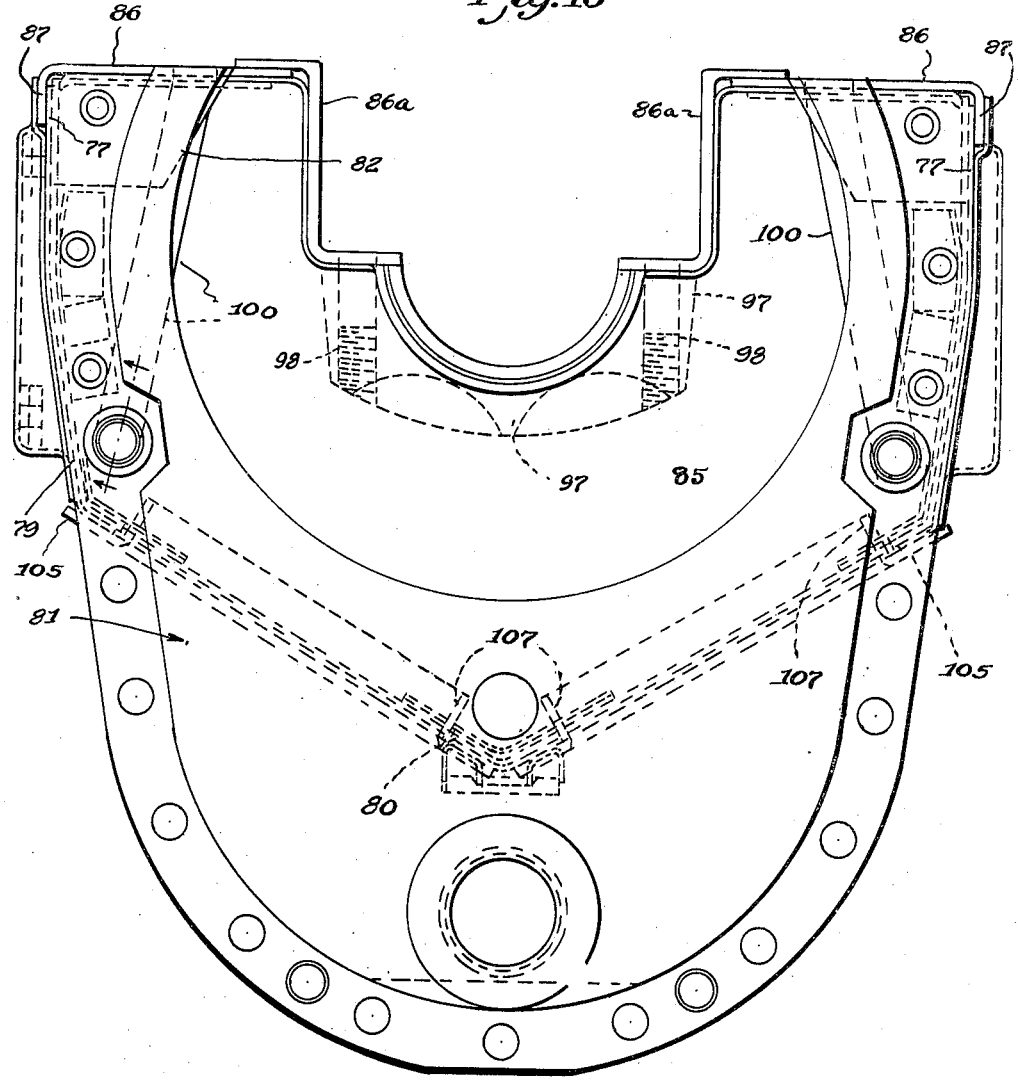
INVENTOR.
James W. Kinnucan
BY
Attorney

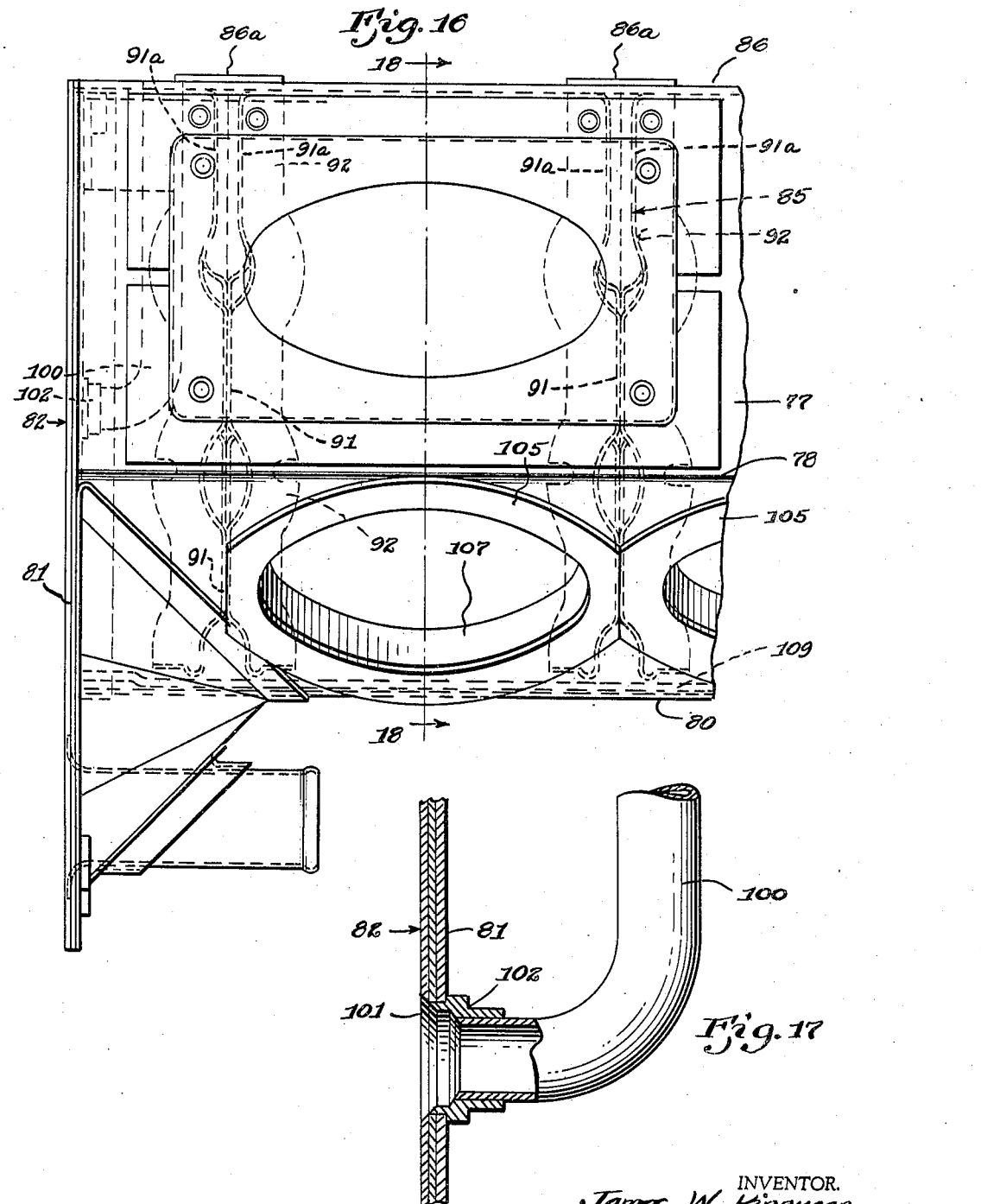

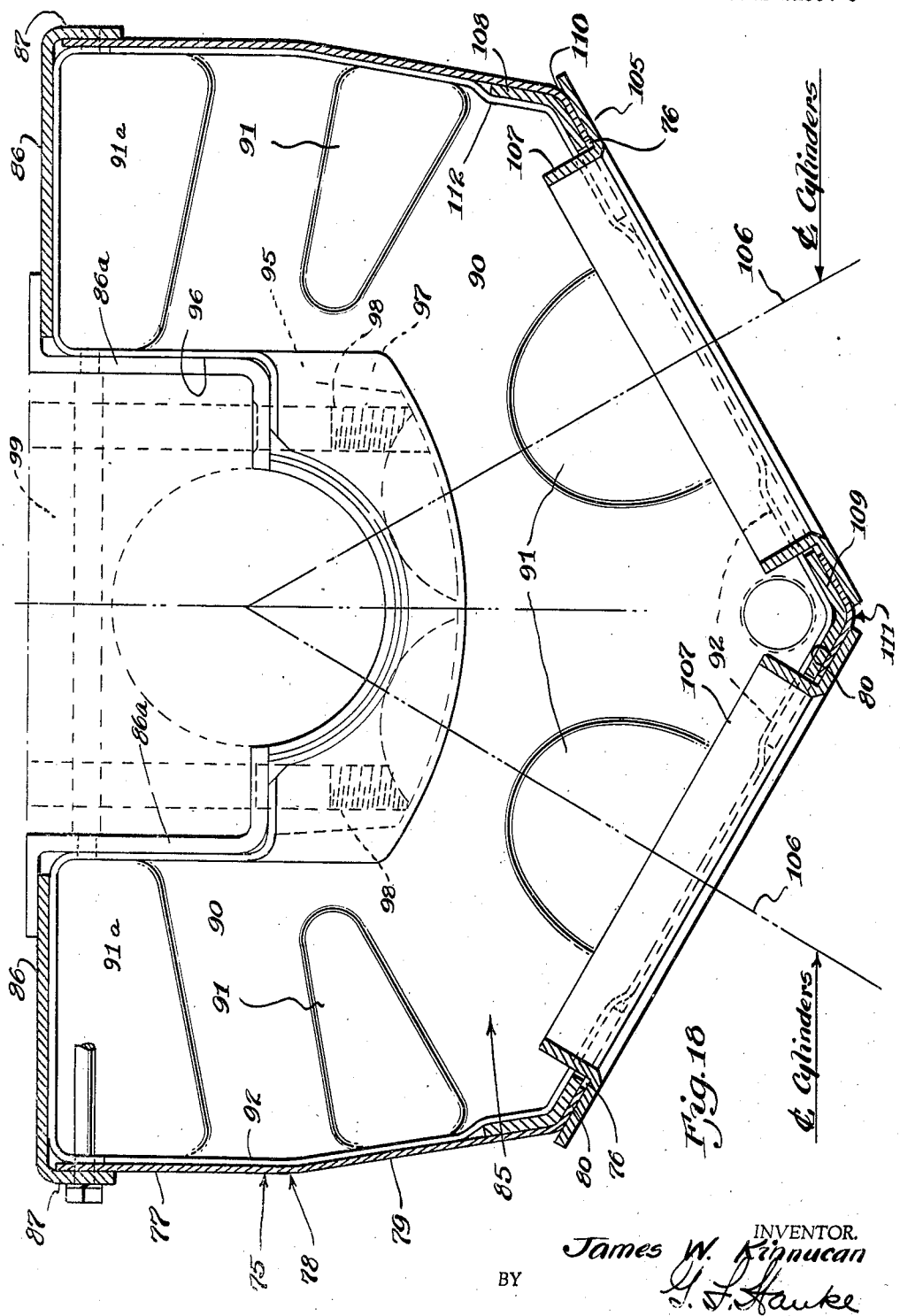

Patented Feb. 8, 1944

2,340,885

UNITED STATES PATENT OFFICE 2,340,885

FABRICATED CRANKCASE STRUCTURE

James W. Kinnucan, Detroit, Mich., assignor to Continental Aviation and Engineering Corporation, Detroit, Mich., a corporation of Virginia Application December 7, 1940, Serial No. 369,031

10 Claims. (Cl. 121—194)

My invention relates to engines, and more particularly to a fabricated crankcase structure particularly constructed and arranged for use with aircraft engines.

In all aircraft engine developments it is essential to maintain the total overall weight of the engine to a minimum, this factor being of extreme importance in connection with line engines designed for aircraft use because of the fact that the crankcase is of such shape and size as to be somewhat of a problem. Therefore, it has been the practice in the past to construct such crankcases of aluminum or other alloy material which is relatively light in weight, in order to keep the engine weight to a minimum. This is usually accomplished by providing a complex cast aluminum crankcase structure ribbed and reinforced in a manner to carry the required loads, which is, of course, considerably lighter in weight than a similar cast iron or forged steel crankcase.

Heretofore, it has been impossible to use a steel crankcase structure because of the fact that it was impractical to cast the necessary thin sections imperative in order to maintain a minimum weight.

An object of my present invention is to construct a steel crankcase structure of minimum weight and maximum strength by providing a fabricated steel crankcase structure utilizing relatively thin steel sections.

Another object of my present invention is to construct an improved steel crankcase structure of minimum weight and maximum strength by providing a fabricated sheet steel crankcase composed of steel stampings welded together and reinforced to form an integral crankcase structure.

A further object of my present invention is to provide an improved steel crankcase structure fabricated for the most part with steel stampings formed of relative thin sections which are ribbed, if necessary, and which are welded together to form an integral crankcase structure of the required strength, which is of such a weight as to be comparable to the former cast crankcase structures of light weight alloy material, such structure being preferably constructed with corner struts extending longitudinally of the crankcase structure.

For a more detailed understanding of my invention, reference may be had to the accompanying drawings illustrating in detail some preferred embodiments of my invention in which like characters refer to like parts throughout the several views and in which:

Fig. 1 is a plan view of a fabricated crankcase structure,

Fig. 2 is a fragmentary detail sectional view taken substantially on the line 2—2 of Fig. 3, Fig. 3 is an end view thereof, Fig. 4 is a fragmentary side elevational view of the crankcase structure shown in Fig. 1, Fig. 5 is a transverse sectional view showing one of the transverse plate sections in elevation and taken substantially on the line 5—5 of Fig. 1, Fig. 6 is a fragmentary plan view of a modified form of construction in which substantially all of the crankcase members are formed of sheet metal stampings, Fig. 7 is a transverse sectional view thereof taken substantially on the line 7—7 of Fig. 6, Figs. 8 to 12, inclusive, are detail sectional views on the lines 8—8, 9—9, 10—10, 11—11, and 12—12 of Fig. 7, Fig. 13 is a diagrammatic perspective view of the sheet metal stamping which forms the crankcase body portion, Fig. 14 is a fragmentary plan view of a fabricated sheet metal crankcase structure of modified construction, Fig. 15 is an end view thereof, Fig. 16 is a fragmentary side elevational view of the aforesaid modified construction illustrated in Fig. 14, Fig. 17 is a detail view taken on the line 17—17 of Fig. 15, and Fig. 18 is transverse sectional view of the fabricated sheet metal crankcase structure taken substantially on the line 18—18 of Fig. 16.

The present crankcase structure consists principally of a body portion 10, end plate structures 11 and 12 and intermediate transverse plate structures 13. The body portion is formed preferably of a steel stamping forming a channel shaped member having side wall portions 14 and a bottom wall portion 15. This bottom wall portion is preferably constructed substantially V-shaped as shown in Figs. 5, 15 and 18 and is thus adapted for use in a V-type interval combustion engine, preferably an engine of the inverted V-type.

Fig. 13 diagrammatically illustrates in perspective the general shape and design of the body portion of my improved steel crankcase. If desired, the side wall portions 14 may be formed to provide a longitudinally extending bulged out portion as at 15a or may be perfectly straight as shown in Fig. 5, or constructed with a contour as shown more particularly in Fig. 18.

The bottom wall of the body portion, as shown in Figs. 1 to 5, inclusive, and 13, is provided with a plurality of aligned openings 16 which are termed cylinder openings and are constructed and arranged for registry with the engine cylinders that are assembled to the crankcase. The end plates 11 and 12 are preferably flanged as at 17 to receive the overlapping portion 18 of the sheet metal crankcase body portion which is preferably welded thereto as indicated at 19. The end plates 11 and 12 carry recessed crankshaft bearing portions 20 and 21 respectively, such recessed portions being arranged to receive suitable crankshaft bearings and the crankshaft bearing cap 22, which may be bolted or otherwise secured to said end plates. The intermediate tranverse plate structures 13 are constructed substantially similar in size and shape and are arranged to substantially abut the interior surface of the crankcase body portion.

Referring more particularly to Figs. 2 and 5, it will be noted that these transverse plate structures may be formed of forgings suitably flanged and ribbed but preferably carrying a peripheral flange portion 23 which is welded along its peripheral surface with the interior surface of the sheet metal body portion as at 24. These transverse plate structures carry recessed crankshaft bearing portions 25 which received bearing caps 26, said bearing caps being bolted or otherwise secured as at 27 to the transverse plate structure. It will be noted that these recessed bearing portions provided seats 28 for supporting the bearing cap and the end plates carry seats 29 of similar design which support the end bearing caps 22.

The structure illustrated in general in Figs. 1 to 5, inclusive, comprises a fabricated steel crankcase structure, in which the body portion of same is composed of a sheet metal stamping formed to provide a channel shaped member to which is welded a plurality of transverse plates, some of which form end plate structures while the remaining plates form intermediate plate structures. It will be noted that the cylinder openings 16 are arranged to be located intermediate the intermediate transverse plates. In this embodiment of my invention a suitable annular reinforcing cylinder flange 30 is secured to the bottom wall of the body portions. It will be noted that in this instance the cylinder reinforcing flange comprises a forging or stamping which embodies a plurality of aligned flange portions 31 connected by neck portions 32 and this is preferably formed integral with the end flange 33.

I prefer generally to construct the entire fabricated crankcase structure of sheet metal stampings and Figs. 6 to 12, inclusive, illustrate in general an embodiment of my invention.

The crankcase body is preferably composed of a sheet metal stamping forming a channel shaped structure having outwardly bowed side wall portions 50 and a V-shaped bottom wall portion 51, said wall portion 51 carrying a plurality of cylinder openings 52. These cylinder openings are preferably arranged in two aligned rows constructed longitudinally of the crankcase structure and are reinforced by the annular rings 53 welded or otherwise permanently secured to the inside surface of the wall portion 51 as clearly shown in Fig. 7. End plates preferably of sheet metal and constructed substantially similar to the end plates illustrated in Fig. 1 are welded to the ends of the body portion and a plurality of intermediate transverse plates 54 are welded at their peripheral edges to the inside surface of the crankcase body portion in substantially the same manner as is the case with the transverse plate members 11, 12 and 13 illustrated in Figs. 1 to 5, inclusive. A top spider like plate 55 having inwardly turned flange portions 56 is secured along the edge of the side walls 50 of the crankcase body portion and is preferably welded thereto and to the intermediate transverse plate portions 54.

It will be observed that these intermediate plate portions carry a crankshaft bearing structure 57 having a recess 57a in which is seated a suitable bearing cap structure 58 secured thereto by means of suitable bolts or other fastening devices 59. Said structure has lateral arms 57b extending immediately underneath the plate 55 and abutting the flange 56. Tie bolts 57c extend through these arms and bearing cap structure 58.

Longitudinal strut members 60 are constructed to unite these intermediate transverse plate structures. These struts, consist generally of substantially U-shaped sheet metal stampings, which are flanged about their outer peripheral edges as at 61, these flanges 61 being preferably welded to the intermediate transverse plate structures and to the inside face of the crankcase body portion, preferably along the line where the wall portions 50 and 51 are joined together. These struts as viewed in cross-section (Fig. 7) extend substantially radially with respect to the recessed crankshaft bearing portions of said intermediate transverse plate structures.

The intermediate plate structure 54 is preferably formed of a pair of sheet metal stampings 54a and 54b welded or otherwise permanently secured together back to back. These sheet metal stampings are preferably provided with ribbed portions 62 which are constructed to register and form a substantially radially extending rib for strengthening the structure of said sheet metal transverse plates. The arrangement of these radially extending ribs is illustrated generally in Fig. 7.

The sheet metal transverse plates may also be provided with suitable pressed out recesses 63 which register to form a bolt receiving recess 64. Preferably the intermediate transverse plates are provided with openings 65 adjoining the end of the bolt receiving recesses 64 for receiving the bolt head 59a.

These various sheet metal sections are all welded together in a suitable fixture and cooperate to provide an integral fabricated steel crankcase structure embodying relative thin sections, which are of minimum weight but of maximum strength. By forming these crankcase parts, which are to be fabricated together, of sheet metal, it is possible to facilitate the mass production of aircraft engine crankcase structures. Furthermore, a mass production of this type of crankcase structure can be more economically manufactured and maintenance of structural dimensional limitations may be had with a fabricated sheet steel crankcase structure constructed in accordance with the preferred embodiment illustrated herein. When these crankcase sections are welded together or otherwise permanently united, the crankcase structure forms an integral assembly which is light in weight and of maximum strength, and furthermore, is comparatively cheap to manufacture. Such a fabricated crankcase structure as herein shown is preferably adaptable for use in a line engine or a multi-cylinder V-type or horizontal opposed engine for aeronautical purposes.

In Figs. 14 to 18, inclusive, I have illustrated a preferred crankcase construction fabricated substantially wholly from sheet metal stampings, this construction being fundamentally the same as those constructions described above, but is a design embodying the principles of my invention which has been constructed more particularly for a practical production engine. In general this modified construction consists of a body portion, end and intermediate transverse plate structures and longitudinally extending struts.

This fabricated steel crankcase structure consists in general of a channel shaped body portion 75 having a plurality of aligned cylinder openings 76 constructed substantially similar to the construction illustrated in Fig. 13. This body portion consists more particularly of the vertical side wall portions 77 which are creased as at 78 and turned slightly inwardly as at 79 and then are formed to provide a substantially "V"-shaped bottom portion 80. This body portion is closed at both ends by transverse end plate structures 81, whose construction is more particularly illustrated in Fig. 16. Other plane end plate structures 82 are preferably secured to the end plates 81 and welded thereto to provide a rigid and rugged fabricated end plate structure. In Fig. 15, the round circles indicate spot welds, also the circles along the sides in Fig. 14 indicate similar spot welds. Intermediate sheet metal transverse plate members or webs 85 are secured, preferably by welding, to the body portion, and are located substantially intermediate the several cylinder openings 76 as more clearly illustrated in Figs. 14 and 16. A top plate 86 is secured to the body portion preferably by welding the down-turned flanges 87 to the side wall portions 77. The top plate 86 is provided with suitable openings 88 in line with the cylinder openings. The intermediate transverse crankcase plates or webs, form partitions which are preferably constructed of a pair of similarly constructed sheet steel stampings 90 assembled together back to back and which are preferably welded together. These stampings are preferably formed with bulges or matched recesses 91 which respectively lie in face contact and serve to stiffen this transverse plate or web and excepting recesses 91a which do not contact with each other, and are further provided with flanges 92 extending about the peripheral edges of same, which flanges are constructed for abutting engagement with the body portion and form a continuous connection therewith. These flanges 92 are preferably welded to the crankcase body portion and to the top plate structure 86.

One of the important structural details of these transverse intermediate plates or webs is the construction which provides a pocket 95 located adjacent the bearing cap recesses 96. A steel bearing block 97 is supported within the recesses 95 and is drilled and tapped as at 98 to receive suitable bolts for securing the bearing cap 99 in place. This block 97 is preferably welded to the walls of the pocket 95 and to the recessed bearing plate 86a, and thus is formed substantially integral with the intermediate transverse plates or webs.

Suitable connections may be provided for fitting tubular members or oil line pipes to this sheet metal crankcase structure. Fig. 17 illustrates one form of construction, in which a pipe 100 is suitably connected with a port 101 in the plate structure and fitted or joined therewith by means of a union or coupling 102.

In the engine construction particularly illustrated in the accompanying drawings the cylinders are arranged in two banks in the form of a V and are particularly arranged to be secured to the crankcase structure, preferably to a cylinder flange 105 which is welded to the body portion of the crankcase structure and suitably centered with respect to the cylinder axes 106. These cylinder flanges are preferably provided with the annular flange portions 107 which project through the cylinder openings 76, which form cylinder pilots.

The crankcase structure is preferably reinforced by longitudinally extending struts and in the present construction these struts comprise angles 108 and 109 preferably welded to the body portion and located to respectively reinforce the body portion at the corner 110 joining the side wall 75 with the bottom wall of the body portion 80, and the crease extending longitudinally of the engine in the bottom wall, as at 111. It will be observed that the intermediate transverse plates are recessed as at 112 to overlie these angle struts at 108 or 109 and preferably these intermediate plates are also welded to the angle struts as is the crankcase body portion.

It will be understood that the fundamental principles embodied in this modified construction illustrated in Figs. 14 to 18, inclusive, are substantially similar in function to the fabricated steel crankcase structure illustrated in Figs. 6 to 13, inclusive, and also embody features which are common to all forms herein illustrated and described.

Although I have illustrated preferred embodiments of my invention and have described in detail certain preferred forms of construction it will be apparent to those skilled in the art to which my invention pertains that various modifications and changes may be made therein without departing from the spirit of my invention or from the scope of the appended claims.

I claim:

1. A fabricated engine crankcase structure comprising a channel V-shaped steel stamping forming a crankcase body portion and having a plurality of rows of longitudinally aligned openings therein constructed and arranged in registry with a plurality of aligned engine cylinders arranged to be secured to said body portion, each row of aligned openings respectively contained in one side of the V-shaped stamping, and plates welded to said body portion at the ends thereof and each carrying a recessed crankshaft bearing portion, said portion recessed to support the crankshaft and bearing cap, the top face of said bearing cap located substantially flush with the top edge of said transverse intermediate and end plates, and intermediate transverse plates all of substantially similar size and shape and welded along their peripheral edges to the interior surface of said body portion.

2. A fabricated engine crankcase structure comprising a channel V-shaped steel stamping forming a crankcase body portion and having a plurality of rows of longitudinally aligned openings therein constructed and arranged to register with a plurality of aligned engine cylinders that are arranged to be secured to said body portion, each row of aligned openings respectively contained in one side of the V-shaped stamping, end plates welded to said body portion at the ends thereof and each carrying a recessed crankshaft bearing portion for housing a crankshaft bearing cap, and a plurality of intermediate transverse plates, all of substantially similar size and shape and continuously welded along their peripheral edges to the interior surface of said body portion, the top face of said bearing cap located substantially flush with the top edge of said transverse intermediate and end plates, said intermediate plates lying in a plane extending substantially normal to the plane surface of said body portion to which said intermediate plates are secured.

3. A fabricated steel engine crankcase structure comprising a sheet metal channel shaped stamping forming a body portion, and a plurality of sheet metal stampings forming transverse plate structures welded along their peripheral edges to the interior surface of said body portion to form an integral fabricated engine crankcase structure, said transverse plate structures each comprising a pair of complementary sheet metal stampings secured together back to back, and longitudinal strut members extending flush against the inner face of the channel shaped stamping and welded to said transverse plate structures and to said body portion.

4. A fabricated steel engine crankcase structure comprising a sheet metal channel shaped stamping forming a body portion, and a plurality of sheet metal stampings forming transverse plate structures welded along their peripheral edges to the interior surface of said body portion to form an integral fabricated engine crankcase structure, said transverse plate structures each comprising a pair of complementary sheet metal stampings secured together back to back, and sheet metal stampings lying in a plane extending longitudinally of the engine intermediate said transverse plates and welded to both said transverse plate structures and to said body portion.

5. A fabricated steel engine crankcase structure comprising a sheet metal channel shaped stamping forming a body portion, and a plurality of sheet metal stampings forming transverse plate structures welded along their peripheral edges to the interior surface of said body portion to form an integral fabricated engine crankcase structure, said transverse plate structures each comprising a pair of complementary sheet metal stampings secured together back to back, and intermediate sheet metal longitudinal strut members extended between and welded to said transverse plate structures and also to said body portion, said sheet metal body portion having a plurality of aligned cylinder openings lying intermediate said transverse plate structures, said strut members recessed at an intermediate point to provide clearance for engine operating elements.

6. A fabricated steel engine crankcase structure comprising a sheet metal channel shaped stamping forming a body portion, and a plurality of sheet metal stampings forming transverse plate structures welded at their peripheral edges to the interior surface of said body portion to form an integral fabricated engine crankcase structure, said transverse plate structures each comprising a pair of complementary sheet metal stampings secured together back to back, and intermediate sheet metal longitudinal strut members welded to said transverse plate structures and to said body portion, said sheet metal body portion having a plurality of aligned cylinder openings lying intermediate said transverse plate structures, and annular flanged reinforcing pilot rings secured peripherally about said cylinder openings, said pilot rings including a cylinder bearing portion aligned normal to the plane of the sheet metal body portion and supporting the cylinder that is to be secured thereto.

7. A fabricated steel engine crankcase structure comprising a sheet metal channel shaped stamping forming a body portion, and a plurality of sheet metal stampings forming transverse plate structures welded along their peripheral edges to the interior surface of said body portion to form an integral fabricated engine crankcase structure, said transverse plate structures each comprising a pair of complementary sheet metal stampings secured together back to back, said channel shaped body portion formed with corners extending longitudinally thereof, and longitudinal strut members welded to the body portion along said longitudinally extending corners and to said transverse plate structures.

8. A fabricated steel engine crankcase structure comprising a sheet metal channel shaped stamping forming a body portion, and a plurality of sheet metal stampings forming transverse plate structures welded along their peripheral edges to the interior surface of said body portion to form an integral fabricated engine crankcase structure, said transverse plate structures each comprising a pair of complementary sheet metal stampings secured together back to back, said channel shaped body portion formed with corners extending longitudinally thereof, and longitudinal strut members welded to the body portion along said longitudinally extending corners and to said transverse plate structures, said strut members extending the full length of said body portion, said intermediate transverse plates being recessed to straddle said strut members.

9. A fabricated steel engine crankcase structure comprising a sheet metal channel shaped stamping forming a body portion, and a plurality of sheet metal stampings forming transverse plate structures welded along their peripheral edges to the interior surface of said body portion to form an integral fabricated engine crankcase structure, said transverse plate structures each comprising a pair of complementary sheet metal stampings secured together back to back, said channel shaped body portion formed with corners extending longitudinally thereof, and longitudinal strut members welded to the body portion along said longitudinally extending corners and to said transverse plate structures, said strut members comprising sheet metal stampings extending intermediate said transverse plates and lying in a plane extending radially inwardly of the crankcase structure from the corner portion of the body portion.

10. A fabricated steel engine crankcase structure comprising a sheet metal channel shaped stamping forming a body portion, and a plurality of sheet metal stampings forming transverse plate structures welded along their peripheral edges to the interior surface of said body portion to form an integral fabricated engine crankcase structure, said transverse plate structures each comprising a pair of complementary sheet metal stampings secured together back to back, said channel shaped body portion formed with corners extending longitudinally thereof, and longitudinal strut members welded to the body portion along said longitudinally extending corners and to said transverse plate structures, said strut members comprising sheet metal stampings extending intermediate said transverse plates and lying in a plane extending radially inwardly of the crankcase structure from the corner portion of the body portion, said strut members welded along opposite sides to adjacent longitudinally spaced transverse plates and along a third side to said body portion.

JAMES W. KINNUCAN.